United States Patent
Okita et al.

(10) Patent No.: US 8,010,302 B2
(45) Date of Patent: Aug. 30, 2011

(54) TOOL PATH DISPLAY APPARATUS FOR MACHINE TOOL

(75) Inventors: Tadashi Okita, Yamanashi (JP);
Hiroyuki Kawamura, Yamanashi (JP);
Junichi Tezuka, Yamanashi (JP);
Kazuyuki Sugiyama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/821,740

(22) Filed: Jun. 23, 2010

(65) Prior Publication Data

US 2011/0015877 A1 Jan. 20, 2011

(30) Foreign Application Priority Data

Jul. 14, 2009 (JP) .................................. 2009-165450

(51) Int. Cl.
*G05B 19/4097* (2006.01)
*G06F 19/00* (2011.01)

(52) U.S. Cl. ........................................................ 702/41
(58) Field of Classification Search ................ 702/41
See application file for complete search history.

(56) References Cited

U.S. PATENT DOCUMENTS

| | | | | |
|---|---|---|---|---|
| 5,144,212 A * | 9/1992 | Izawa et al. | .................... | 318/569 |
| 6,549,824 B1 * | 4/2003 | Satou et al. | .................... | 700/162 |
| 2011/0046773 A1 * | 2/2011 | Iwashita et al. | .............. | 700/182 |

FOREIGN PATENT DOCUMENTS

| | | |
|---|---|---|
| JP | 01258106 A | 10/1989 |
| JP | 03264215 A | 11/1991 |
| JP | 07005908 | 1/1995 |
| JP | 11156671 A | 6/1999 |
| JP | 11224116 A | 8/1999 |
| JP | 2008009637 | 1/2008 |

OTHER PUBLICATIONS

Notification of Reasons for Refusal for Japanese Application No. 2009-165450, mailed Sep. 21, 2010.
Altintas, Y. et al., "Virtual Machine Tool," CIRP Analysis, vol. 54, Nr. 2, pp. 115-138, Jan. 1, 2005/ISSN 0007-8506.
German Office Action for 10 2010 017 763.6 dated Mar. 2, 2011.

* cited by examiner

*Primary Examiner* — Cindy Hien-Dieu Khuu
(74) *Attorney, Agent, or Firm* — Lowe Hauptman Ham & Berner LLP

(57) ABSTRACT

First and second screens are set for a tool path display apparatus for displaying a path of the tip of a tool attached to a machine tool. The first screen displays the three-dimensional path of the tip of the tool obtained by synthesizing the position information of the drive axes of a 5-axis machine tool. The second screen displays the waveforms of the position deviations and current instructions of the drive axes in chronological order. When a part (line segment) of the three-dimensional path of the tip of the tool is selected on the first screen, the display attribute of the corresponding time area is changed on the second screen so that the time area can be identified.

7 Claims, 11 Drawing Sheets

FIG. 4
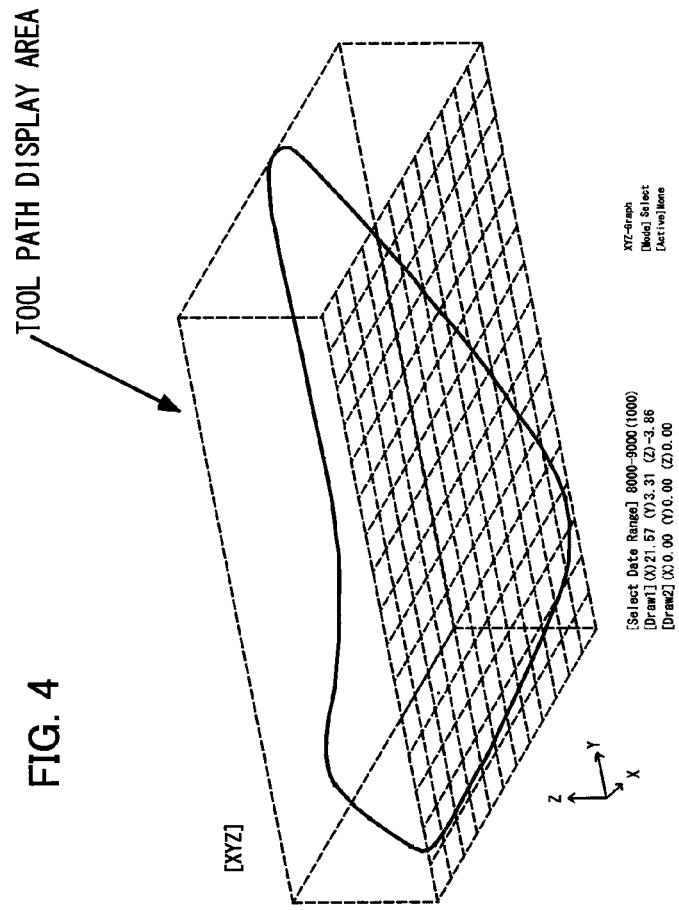
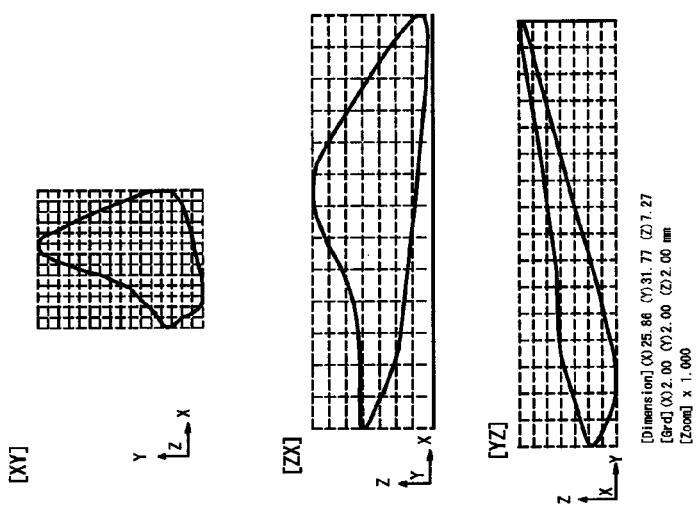
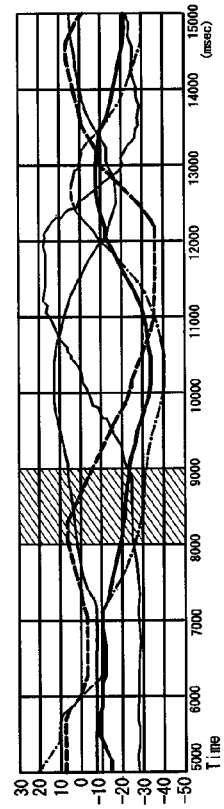

TOOL PATH DISPLAY APPARATUS FOR MACHINE TOOL

RELATED APPLICATIONS

The present application is based on, and claims priority from, Japanese Application Number 2009-165450, filed Jul. 14, 2009, the disclosure of which is hereby incorporated by reference herein in its entirety.

BACKGROUND OF THE INVENTION

1. Field of the Invention

The present invention relates to a tool path display apparatus for machine tools and, more particularly, to a display apparatus capable of visually grasping the correspondence between the position of a tool tip in a three-dimensional path and the position in a time axis of time-series waveform data for each of axes.

2. Description of the Related Art

Some currently-used numerical controllers for controlling machine tools have a function of displaying a specified path or a function of displaying the path in which the tool actually moved.

Japanese Patent Application Laid-Open No. 7-5908 discloses a measuring/monitoring apparatus that obtains a position signal etc. from appropriate points in a controller controlling the position and speed for machine operation. The measuring/monitoring apparatus creates time-series data by sampling the obtained signals at specified intervals, graphically displays a motion path in real time by calculating the time-series data, thereby enabling the monitoring of the controller and the measuring of the precision of the motion path.

Japanese Patent Application Laid-Open No. 2008-9637 discloses a display method of an NC program for controlling the motion of each drive axis. The NC program calculates and displays the target motion position for each drive axis, the motion path to the target motion position, and the feedrate. The actual feedrate and its acceleration/deceleration at an arbitrary machining position and elapsed time can be obtained from the display, so the state of the NC program can be recognized.

A 5-axis machine tool has a rotation axis as a drive axis, so it is difficult to intuitively grasp the correspondence between the motion of each of the drive axes and the motion of the tool tip. Accordingly, when a particular position on a machined surface is defective, it is difficult to identify the part corresponding to the defective part even by measuring the waveform of each drive axis that is working.

Japanese Patent Application Laid-Open No. 7-5908 above proposes a technique for calculating time-series measurement data and displaying the tool path, but does not propose a method of determining characteristic points. Japanese Patent Application Laid-Open No. 2008-9637 proposes a technique for evaluating the validity of an NC program, but does not propose a specific evaluation method using the actual position data of each drive axis or does not refer to the association between the tool path and the waveform of each drive axis.

SUMMARY OF THE INVENTION

The object of the present invention is to provide a display apparatus for a machine tool that is capable of visually grasping the correspondence between the position, in a three-dimensional path, of a tool tip for which the position and attitude are controlled by drive axes including a rotation axis and the position in the time axis of waveform data for each of the axes.

The display apparatus for a machine tool according to the present invention displays the path of the tool tip attached to the machine tool. The position and attitude of the tool and the workpiece machined by the tool are controlled by a plurality of drive axes including a rotation axis.

A first aspect of the tool path display apparatus includes a data acquisition means that concurrently acquires and stores position information, speed information, acceleration information, position deviation information, and a torque command of each of the drive axes at each time moment, as time-series data, a tool path calculation means that calculates three-dimensional coordinates of the tool tip with respect to a coordinate system fixed to a workpiece using the position information of each of the drive axes at each time moment and structure information of the machine tool and obtains the three-dimensional path of the tool tip, a display means that displays, as a time-series waveform, at least one of the three-dimensional path of the tool tip obtained by the tool path calculation means and the time-series data obtained by the data acquisition means, a tool path selection means that selects any part of the three-dimensional path of the tool tip displayed by the display means, and a first display attribute change means that changes a display attribute of part of three-dimensional path of the tool tip selected by the tool path selection means and the time-series waveform in a time area in which position information underlying the three-dimensional coordinates that corresponds to the part of three-dimensional path is obtained.

The tool path display apparatus further can include time axis selection means that selects any part of a time axis of the time-series waveform displayed by the display means and second display attribute change means that changes a display attribute of the time-series waveform corresponding to the part of the time axis selected by the time axis selection means and the three-dimensional path of the tool tip corresponding to the part of the time axis selected by the time axis selection means.

A second aspect of the tool path display apparatus includes a data acquisition means that concurrently acquires and stores position information, speed information, acceleration information, position deviation information, and a torque command of each of the drive axes at each time moment, as time-series data, a tool path calculation means that calculates three-dimensional coordinates of the tool tip with respect to a coordinate system fixed to a workpiece using the position information of each of the drive axes at each time moment and structure information of the machine tool and obtains the three-dimensional path of the tool tip, a display means that displays, as a time-series waveform, at least one of the three-dimensional path of the tool tip obtained by the tool path calculation means and the time-series data obtained by the data acquisition means, time axis selection means that selects part of a time axis of a time-series waveform displayed by the display means, and a display attribute change means that changes a display attribute of the time-series waveform corresponding to the part of the time axis selected by the time axis selection means and a display attribute of a three-dimensional tool path of the tool tip corresponding to the part of the tool axis selected by the time axis selection means.

The tool path display means further includes first threshold setting means that sets a threshold to be compared with at least one of the position deviation and the torque command of each of the drive axes, in which when at least one of the position deviation and the torque command exceeds the threshold, the time axis selection means may select a preset time range including a time moment at which the threshold is exceeded.

The tool path display means further includes position deviation calculation means that multiplies a position deviation of the rotation axis by a rotation radius, which is a distance between a rotation center axis of the rotation axis and the tool tip, to calculate a second position deviation and second threshold setting means that sets a second threshold to be compared with the second position deviation calculated by the position deviation calculation means, in which when the second position deviation exceeds the second threshold, the time axis selection means may select a preset time range including a time moment at which the second threshold is exceeded.

The tool path display apparatus further includes position deviation synthetic value calculation means that calculates a three-dimensional position deviation vector at the tool tip using the position information, the position deviation, and the machine structure information of each of the drive axes at each time moment and calculates the length of the calculated three-dimensional position deviation vector as a position deviation synthetic value and third threshold setting means that sets a third threshold to be compared with the position deviation synthetic value calculated by the position deviation synthetic value calculation means, in which when the third position deviation exceeds the third threshold, the time axis selection means may select a preset time range including the time moment at which the third threshold is exceeded.

The tool path display apparatus further includes gravity load calculation means that calculates a load torque by gravity applied to each of the drive axes using preset information of gravity applied to the drive axis, the machine structure information, and position information of each of the drive axes at each time moment, torque command calculation means that obtains a second torque command by subtracting the load torque by gravity from the torque command, and fourth threshold setting means that sets a fourth threshold to be compared with the second torque command calculated by the torque command calculation means, in which when the second torque command exceeds the fourth threshold, the time axis selection means may select a preset time range including a time moment at which the fourth threshold is exceeded.

The tool path display apparatus further includes synthetic value calculation means that calculates a synthetic speed vector or a synthetic acceleration vector at the tool tip using the position information and the machine structure information of each of the drive axes at each time moment and calculates a length of the calculated vector as a synthetic speed or synthetic acceleration and fifth threshold setting means that sets a fifth threshold to be compared with the synthetic speed or the synthetic acceleration calculated by the synthetic value calculation means and, in which when the synthetic speed or the synthetic acceleration exceeds the fifth threshold, the time axis selection means may select a preset time range including a time moment at which the fifth threshold is exceeded.

With the above structure, the tool path display apparatus can intuitively grasp the motion of each axis in response to a point in the tool path and efficiently adjust the motion of each axis. In addition, comparison with each of the thresholds enables the correspondence between the tool path that does not meet the range of the threshold and each of time-series information items to be clearly defined, making the identification of an axis or a point in the tool path with characteristic motion.

BRIEF DESCRIPTION OF THE DRAWINGS

The purposes and advantages of the present invention, including those described above, will clarified by reference to the attached drawings in combination with the description of the embodiment presented below.

FIG. 4 is an example of a tool path and the position information of drive axes displayed by the tool path display apparatus according to the present invention.

DETAILED DESCRIPTION OF THE PREFERRED EMBODIMENTS

Figure 1:
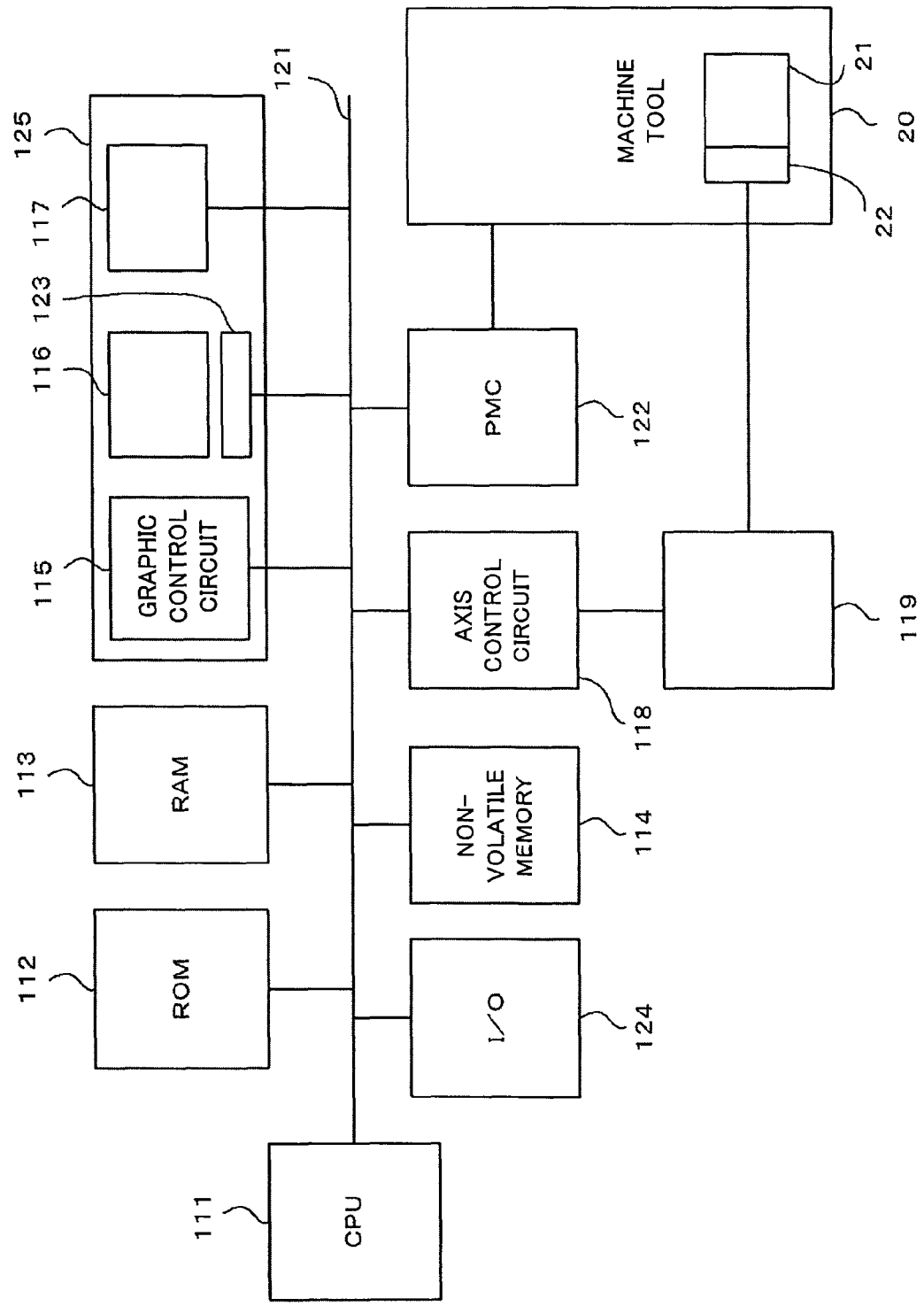
FIG. 1 is a block diagram schematically showing the structure of a numerical controller that controls a machine tool to which a tool path display apparatus according to the present invention is applied.

FIG. 1 is a block diagram schematically showing the structure of a numerical controller that controls a machine tool to which a tool path display apparatus according to the present invention is applied.

A CPU 111 (processor) controls a whole numerical controller 10 according to a system program stored in a ROM 112. A RAM 113 stores various data items or input/output signals. A non-volatile memory 114 stores position information, speed information, acceleration information, position deviations, and torque commands, which will be described below, in chronological order according to time information including times at which they were obtained. These data items remain in the non-volatile memory 114 after power-off.

A graphic control circuit 115 converts digital signals into display signals and gives them to a display device 116. A keyboard 117, which has numerical keys and character keys, is used to input various settings. The CPU 111 processes various information items and the tool path of a tool attached to a machine tool 20 and the various information items corresponding to the tool path are thereby displayed on a display device 116.

An axis control circuit 118 receives a motion command for each axis from the CPU 111 and outputs the motion command to a servo amplifier 119 corresponding to each axis. The servo amplifier 119 receives the motion command and drives a servo motor 21 included in the machine tool 20.

The ROM 112, the RAM 113, the non-volatile memory 114, the graphic control circuit 115, the display device 116, the keyboard 117, and the axis control circuit 118 are connected through a bus 121. The servo motor 21, which is included in the machine tool 20 to drive feed axes, incorporates a position sensing device 22. A position signal sensed by the position sensing device 22 is output to the axis control circuit 118 through a signal path (not shown) as a position feedback signal.

A PMC (programmable machine controller) 122 receives a T function signal (tool selection signal) and other signals through the bus 121 during execution of a machine program. The PMC 122 then processes the received signal using a sequence program and outputs a signal as an operation instruction to control the machine tool 20. In addition, the PMC 122 receives a status signal from the machine tool 20 and transfers necessary input signals to the CPU 111.

In addition, a software key 123, which has a function changed by a system program etc., and an interface 124, which transfers NC data to a storage device or other external devices, are connected to the bus 121. This software key 123, the display device 116, and keyboard 117 are disposed on a display device/MDI (manual data input) panel 125.

Figure 2:
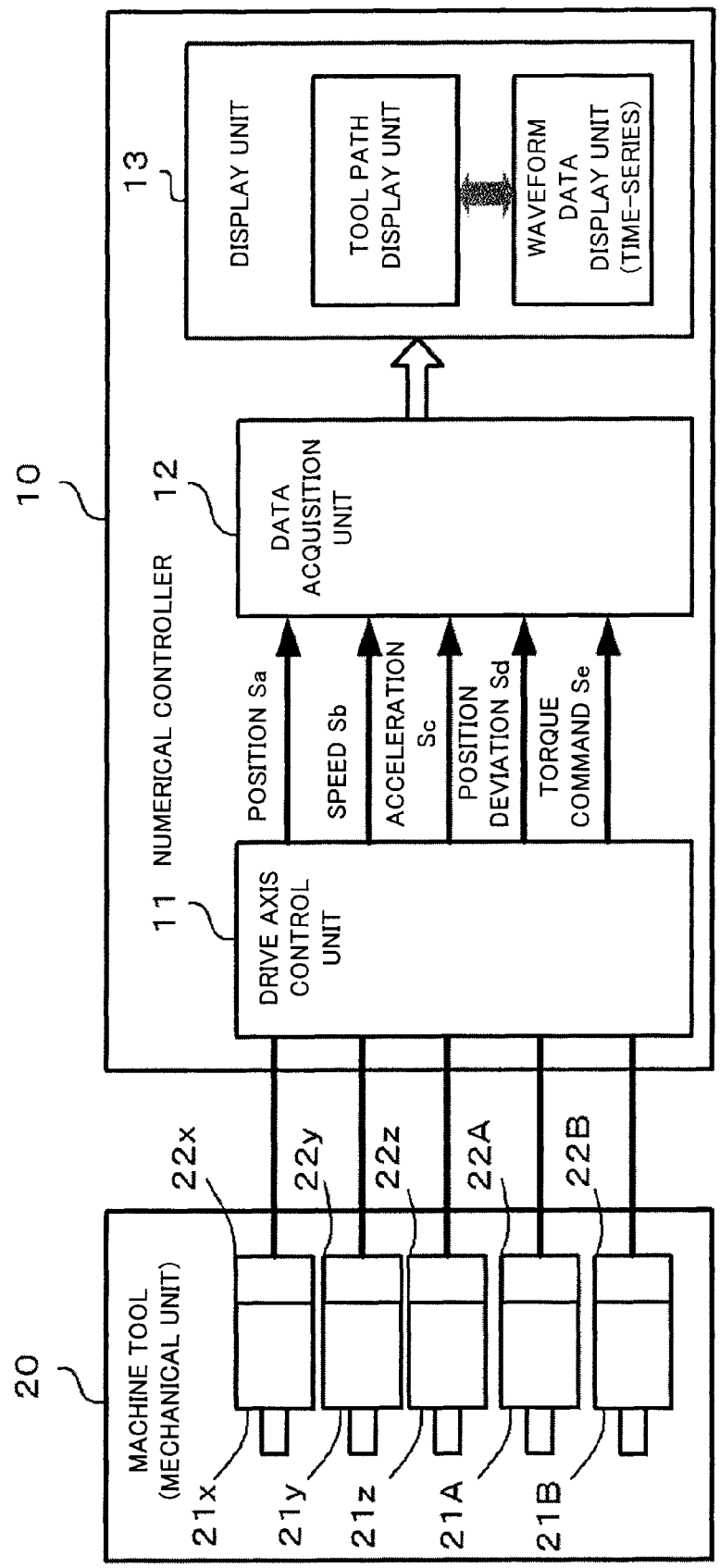
FIG. 2 is a block diagram showing the substantial part of a first embodiment of the tool path display apparatus according to the present invention.

FIG. 2 is a block diagram showing the substantial part of a first embodiment of the tool path display apparatus according to the present invention. In this embodiment, the tool path display apparatus is included in the numerical controller 10 of the machine tool. The numerical controller 10 includes a drive axis control unit 11, a data acquisition unit 12, and a display unit 13.

The machine tool 20 has servo motors 21x, 21y, 21z, 21A, and 21B, each of which drives a separate feed axis. Servo amplifiers (not shown) are controlled by a torque command from the drive axis control unit 11 of the numerical controller 10. The servo motors 21x, 21y, 21z, 21A, and 21B are driven by the corresponding servo amplifiers (not shown).

The servo motors 21x, 21y, 21z, 21A, and 21B have position detectors 22x, 22y, 22z, 22A, and 22B, respectively. The position information of the servo motors 21x, 21y, 21z, 21A, and 21B is fed back to the drive axis control unit 11 from the position detectors 22x, 22y, 22z, 22A, and 22B.

The drive axis control unit 11 calculates speed information Sb, acceleration information Sc, position deviation Sd, and torque command Se of drive axes X, Y, Z, A, and B from a motion command issued by a numerical control unit, which analyzes and processes the machining program of the numerical controller 10, and position information Sa fed back from the servo motors 21x, 21y, 21z, 21A, and 21B. The drive axis control unit 11 then outputs the calculated speed information Sb, acceleration information Sc, position deviation Sd, and torque command Se as well as the fed back position information Sa to the data acquisition unit 12. Such position information Sa, speed information Sb, acceleration information Sc, position deviation Sd, and torque command Se are conventionally used by a numerical controller that controls a machine tool, so details on the calculation method etc. will not be described here.

The data acquisition unit 12 concurrently obtains these information items at certain intervals from the drive axis control unit 11. The obtained information items are stored in a memory (not shown). The display unit 13 displays the three-dimensional motion path of a tool tip based on the information items obtained by acquisition unit 12 and displays at least one of the information items as time-series data.

Figure 3:
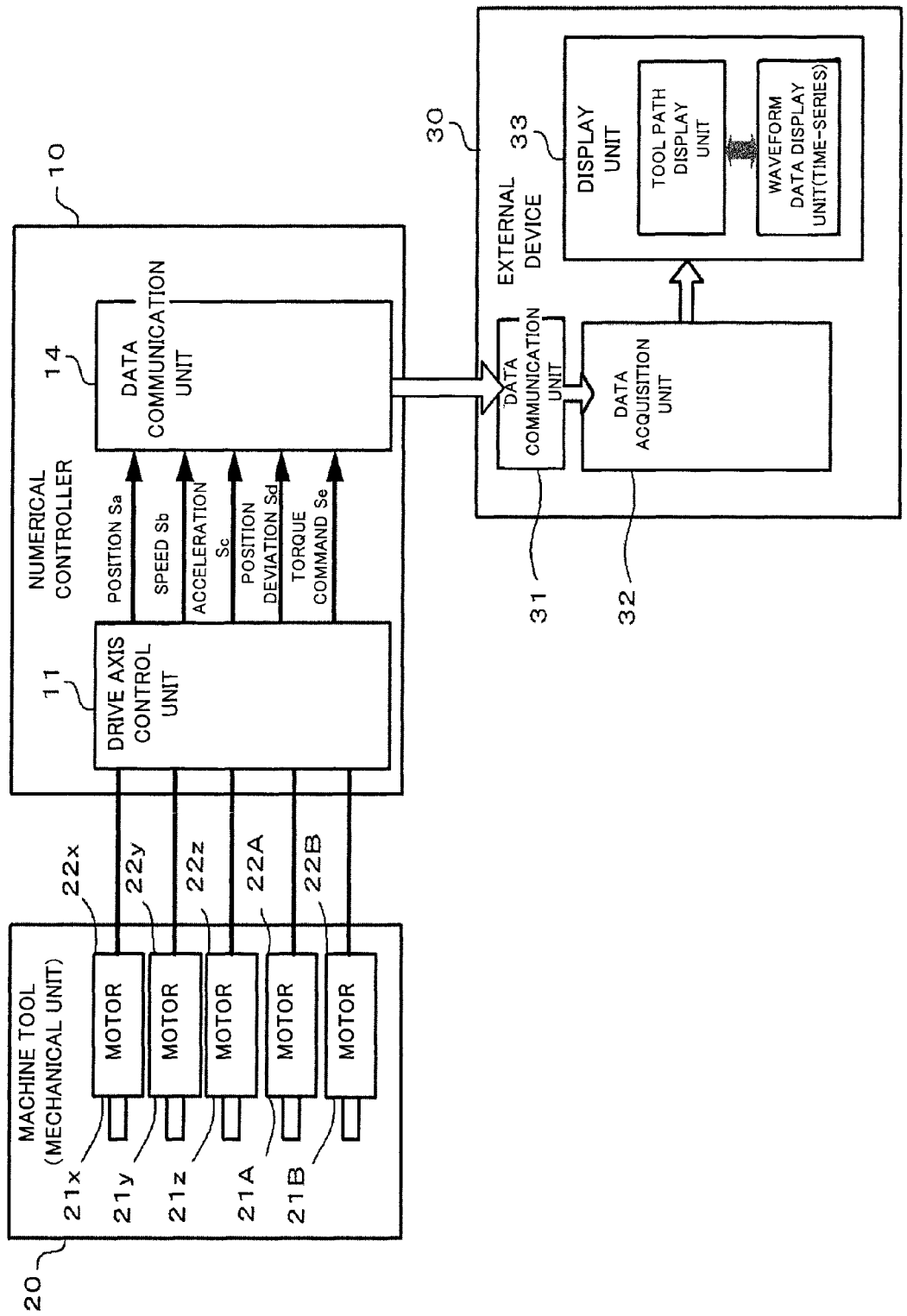
FIG. 3 is a block diagram showing the substantial part of a second embodiment of the tool path display apparatus according to the present invention.

FIG. 3 is a block diagram showing the substantial part of a second embodiment of the tool path display apparatus according to the present invention. In this embodiment, the tool path display apparatus is not incorporated in the numerical controller 10 of the machine tool, but incorporated in an external device 30. The numerical controller 10 includes the drive axis control unit 11, a data communication unit 14, and a display unit (not shown). The external device 30 includes a data communication unit 31, a data acquisition unit 32, and a display unit 33.

Figure 5:
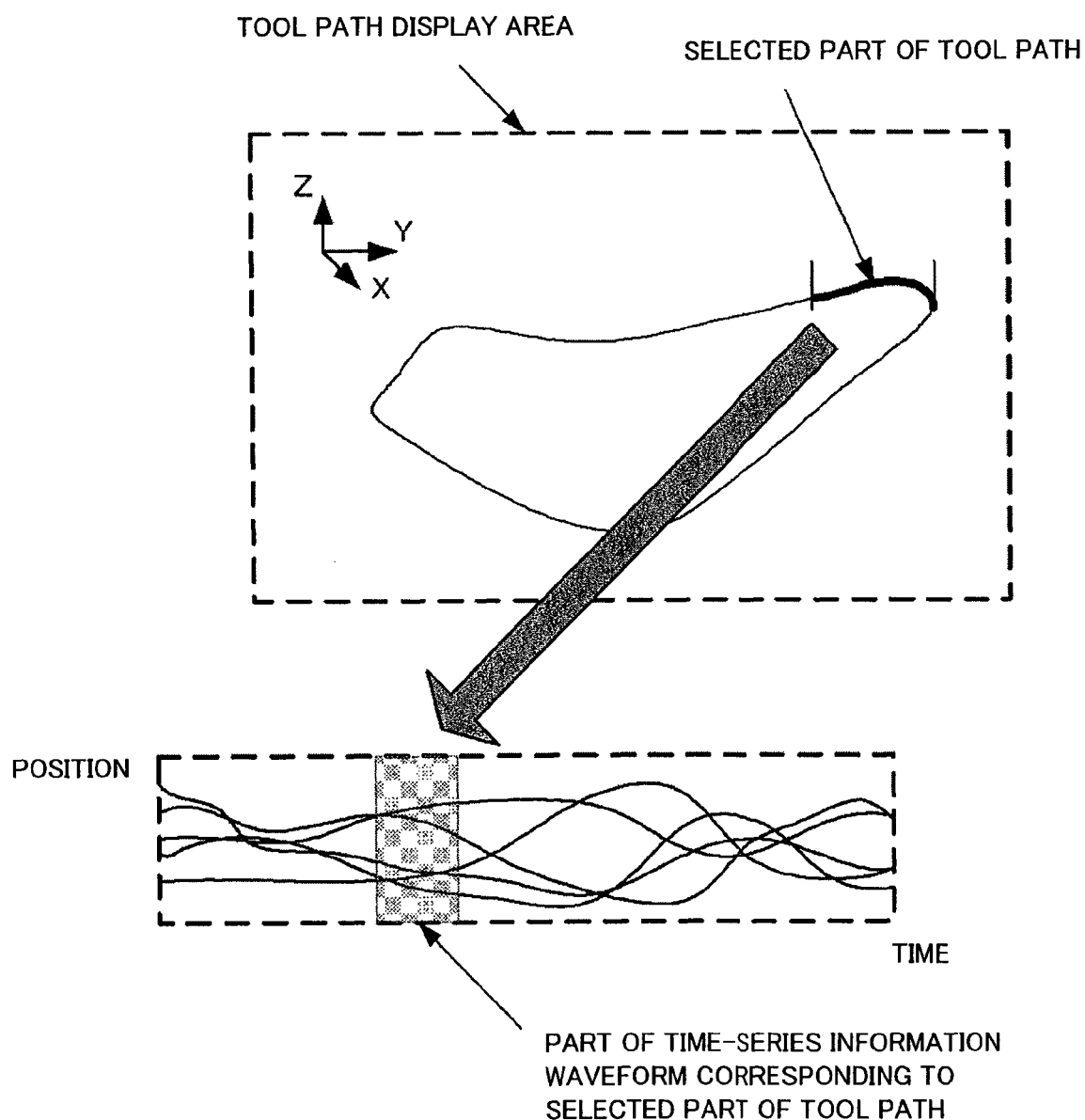
FIG. 5 schematically shows the tool path and the waveforms (time-series waveforms) of position information of the drive axes shown in FIG. 4.

FIG. 4 is an example of the tool path and the position information of the drive axes displayed by the tool path display apparatus according to the present invention. FIG. 5 schematically shows the tool path and the waveforms (time-series waveforms) indicating position information of the drive axes shown in FIG. 4.

The tool path and the position information of the drive axes shown in FIGS. 4 and 5 are displayed on, for example, the display device 116 shown in FIG. 1. The display screen of the display device 116 is divided into two areas: a tool path display area in which a tool path is displayed and a position information display area in which the position information of the drive axes is displayed. In the display examples in FIGS. 4 and 5, tool paths are represented in three-dimensional display using the X-, Y-, and Z-axes and two-dimensional display using the X- and Y-axes, the Z- and X-axes, and the Y- and Z-axes in the tool path display area. In the position information display area (waveform data display area), the position information (the position information of the X-, Y-, Z-, A-, and B-axes) of the drive axes are plotted on graphs as time-series data (time-series waveform) with time on the horizontal axis and position data on the vertical axis.

In an embodiment of the tool path display apparatus according to the present invention, at least one part of a tool path displayed in a tool path display area can be selected by a cursor or other means and the display attribute (for example, the color, thickness, or background color) of the time area corresponding to the selected part (line segment) of the tool path can be changed. In the example shown in FIG. 5, the background color of PART OF TIME-SERIES INFORMATION WAVEFORM CORRESPONDING TO SELECTED PART OF TOOL PATH in the position information (time-series waveform) of the X-, Y-, Z-, A-, and B-axes displayed in the position display area corresponding to SELECTED PART OF THE TOOL PATH displayed in TOOL PATH DISPLAY AREA is changed. This type of display format allows the user to easily grasp, from the screen, the correspondence between the selected part of the tool path and the part of the time-series information waveform corresponding to the time area in which the three-dimensional coordinates of the part is obtained.

Next, examples of data items used to determine (change) the display attribute of a tool path to be displayed on the display device are shown below.

FIRST EXAMPLE

Position Deviation of Drive Axes

Figure 6A:
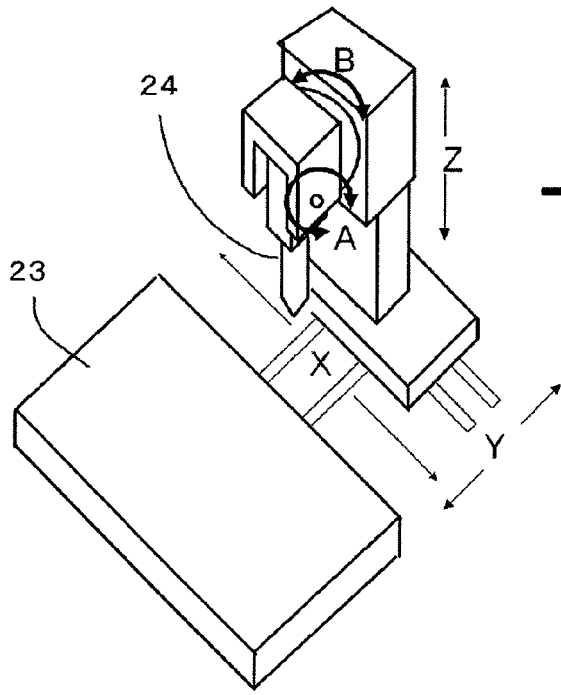
FIG. 6 shows the calculation of the coordinates of a tool tip.
Figure 6B:
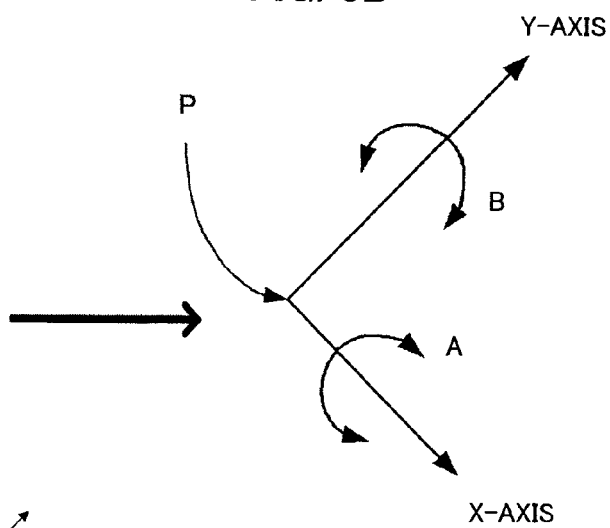

FIG. 6 shows the calculation of the coordinates of a tool tip. Although a 5-axis machine tool is configured so that a table is turned with two rotation axes or both a table unit and tool head unit are turned, a machine tool of tool head rotation type shown in FIG. 6 is taken here as an example. In the structure shown in FIG. 6, two rotation axes intersect at right angles in one point. In a more typically structure, the two rotation axes may not intersect, arranged skewed with respect to each other. In this case, if the spatial relation of these two rotation axes is determined, the coordinates of the tool tip can be calculated. The 5-axis machine tool which is described below is assumed to have the same machine structure as in FIG. 6, but it should be noted that the present invention is also applicable to a 5-axis machine tool having other machine structures.

The X-, Y-, and Z-axes are linear axes and the A- and B-axes are rotation axes. The coordinates of these five axes at time t are assumed to be x(t), y(t), z(t), a(t), and b(t). If the intersection of the rotation center axes of the A-axis (rotation axis about the X-axis) and the rotation center axis of the B-axis (rotation axis about the Y-axis) is assumed to be point P, then the coordinates of the point P are (x(t), y(t), z(t)) when a coordinate system fixed to a workpiece is considered and the origin is set appropriately.

If the distance between point P and the tool tip is L and the position in which the tool faces directly downward is the reference position (origin) of the A-axis and the B-axis, the coordinates (PosX, PosY, PosZ) of the tool tip are represented by the following equations.

$$PosX = x(t) + L \times \cos(a(t)) \times \sin(b(t))$$

$$PosY = y(t) + L \times \sin(a(t))$$

$$PosZ = z(t) - L \times \cos(a(t)) \times \cos(b(t))$$

As described above, the coordinates (PosX, PosY, PosZ) of the tool tip can be calculated from position information (x(t), y(t), z(t), a(t), b(t)) for five axes and the machine structure (L) of a machine tool.

Figure 7:
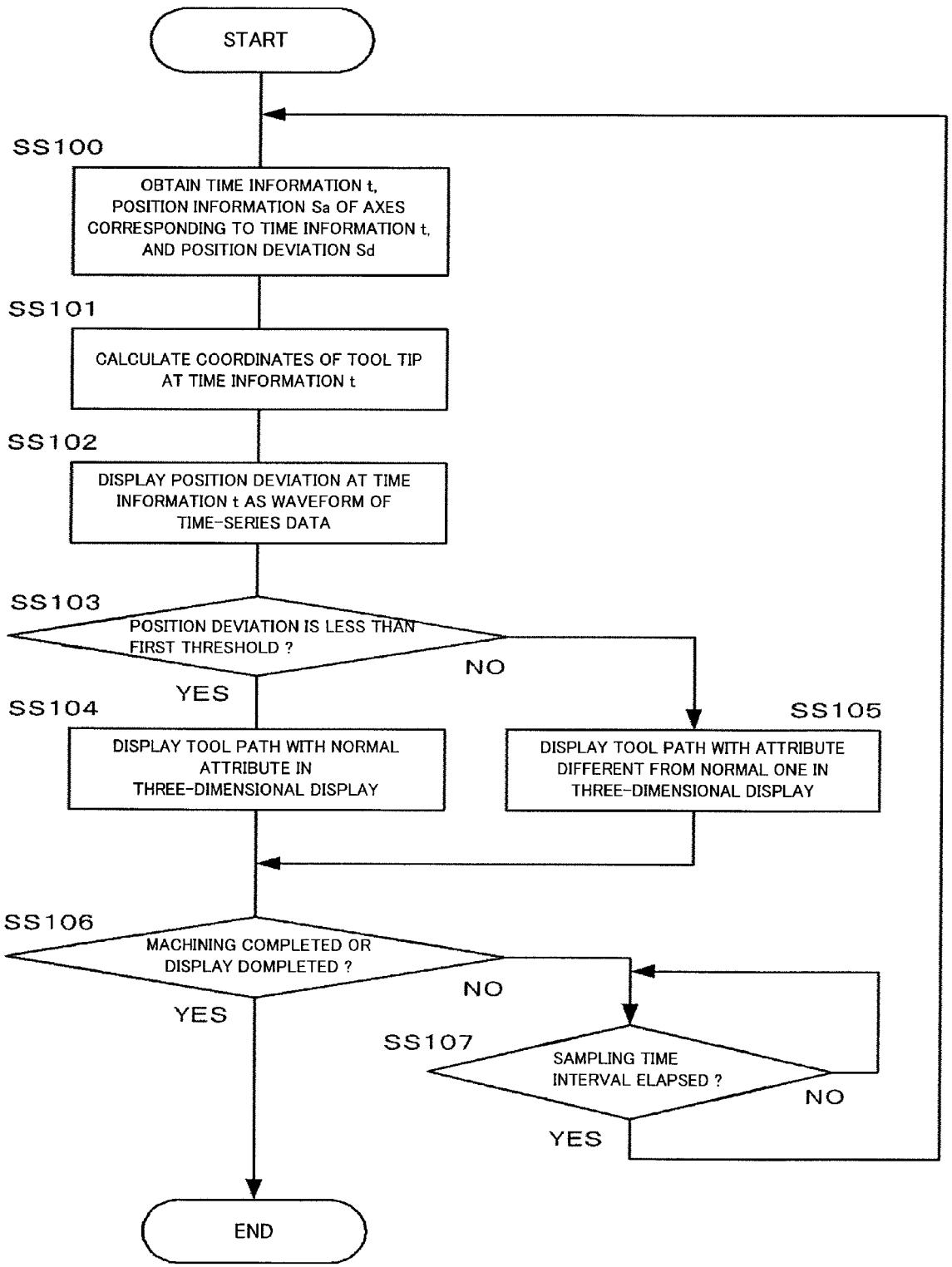
FIG. 7 is a flowchart showing an algorithm of display processing in which an embodiment of the tool path display apparatus according to the present invention selects a display attribute based on a position deviation.

FIG. 7 is a flowchart showing the algorithm of display processing performed by the embodiment of the tool path display apparatus according to the present invention. The algorithm of this processing is an example of changing the display attribute of a tool path when the position deviation is equal to or greater than a predetermined threshold. This display processing may be started by an instruction from the operator, started when the machine tool 20 controlled by the numerical controller 10 starts machining the workpiece, or started when the time-series data of the drive axes becomes available. The display processing will be described by following the steps.

[Step SS100] The time information t, the position information Sa corresponding to the time information t, and the position deviation Sd are obtained.

[Step SS101] The three-dimensional coordinates of the tool tip at the time information t obtained in step SS100 are calculated.

[Step SS102] The position deviation at the time information t is displayed as the waveform of time-series data.

[Step SS103] Whether the position deviation displayed in step SS102 is smaller than a preset first threshold is determined. The processing proceeds to step SS105 if it is smaller or to step SS105 if it is not smaller.

[Step SS104] The tool path is displayed with the normal display attribute in three-dimensional display.

[Step SS105] The tool path is displayed with an attribute different from the normal one in three-dimensional display.

[Step SS106] Whether the workpiece has been machined by the machine tool is determined (or whether the display completion signal is present). If the workpiece has been machined (or the display completion signal is present), this display processing is completed. If the workpiece has not been machined (or the display completion signal is not present), the processing proceeds to step SS107.

[Step SS107] After a lapse of the sampling time for displaying on the display device, the processing returns to step SS100 and this display processing continues.

SECOND EXAMPLE

Torque Command

In the display processing in FIG. 7, the torque command Se can also be used instead of the position deviation Sd. In this case, it is sufficient to change the above algorithm so that the torque command is obtained instead of the position deviation in step SS100, the torque command obtained in step SS100 is displayed as the waveform of time-series data in step SS102, and the torque command obtained in step SS102 is compared with a preset threshold for comparison of torque commands in step SS103.

THIRD EXAMPLE

Position Deviation of Rotation Axes (Second Position Deviation)

Figure 8:
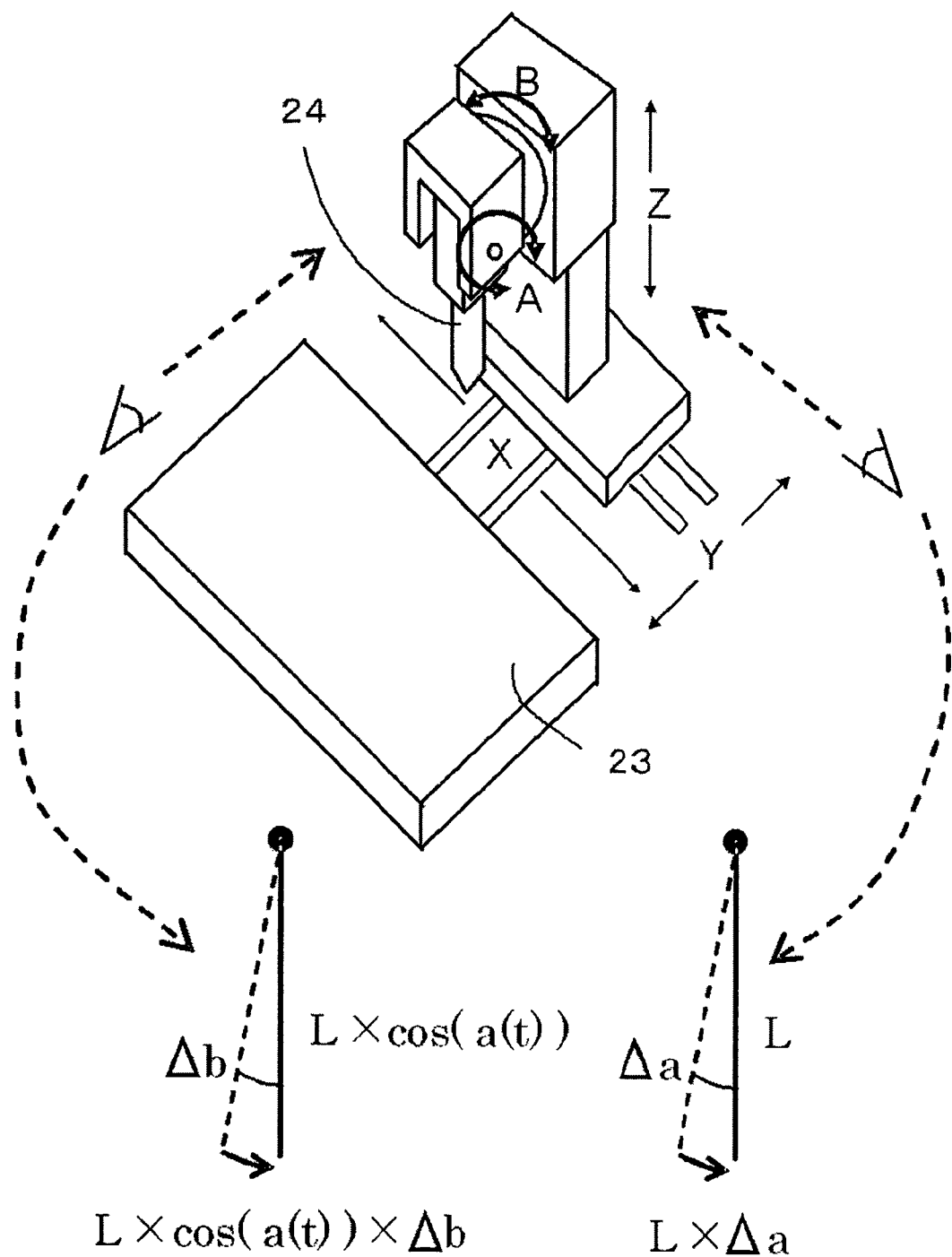
FIG. 8 describes the calculation of a position deviation (second position deviation) in case where the second position deviation is compared with the threshold in display processing.

FIG. 8 describes the calculation of a position deviation (second position deviation) in case where the second position deviation is compared with a threshold in display processing.

If the position deviation (angle deviation) of the A-axis is assumed to be $\Delta a$, the second position deviation of the A-axis is represented by $L \times \Delta a$, where L is a tool length (a constant value) which equals to the distance between the rotation axis of the A-axis and the tool tip. If the position deviation (angle deviation) of the B-axis is assumed to be $\Delta b$, the distance between the rotation axis of the B-axis and the tool tip equals $L \times \cos(a(t))$, which depends on the position of the A-axis. Accordingly, the second position deviation of the B-axis equals $L \times \cos(a(t)) \times \Delta b$.

Figure 9:
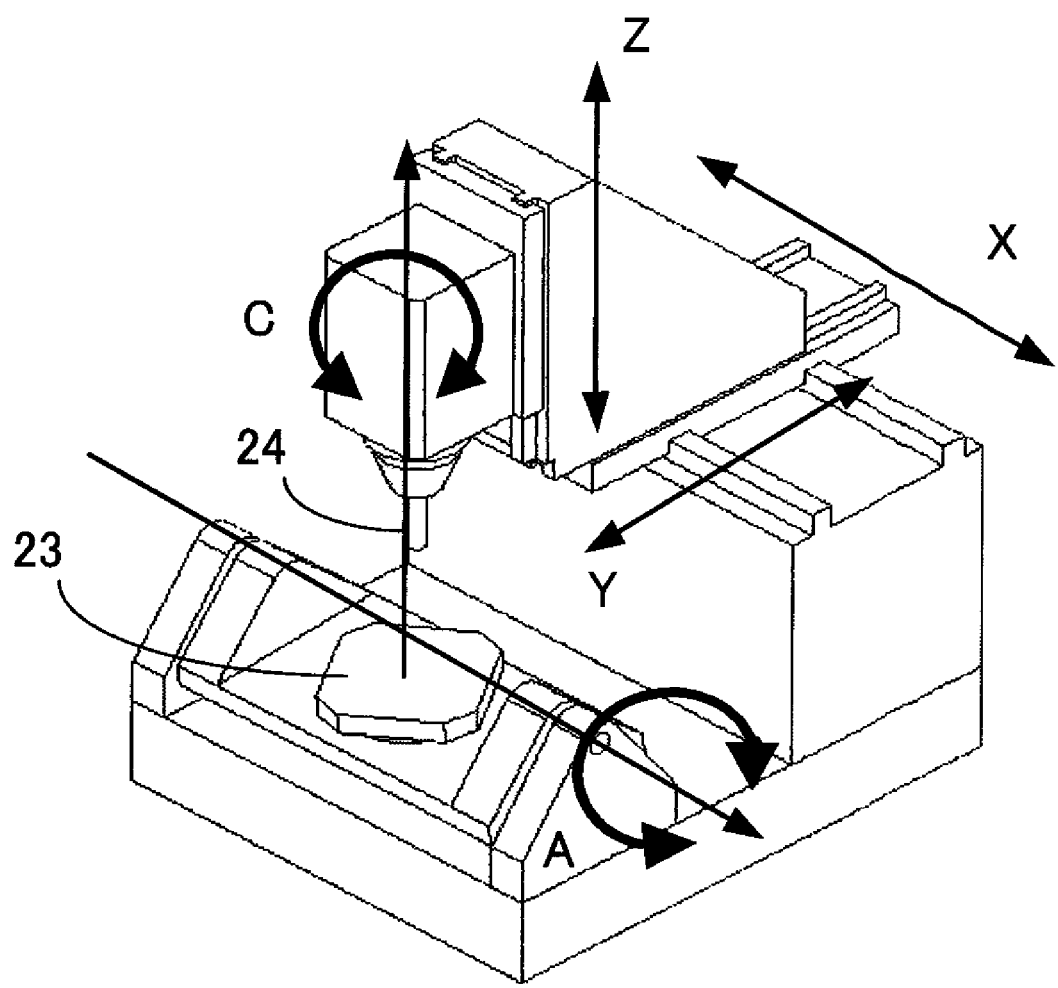
FIG. 9 is a perspective view of a machine with a rotating table, which also enables the calculation of the second position deviation as in FIG. 8.

The second position deviation can be calculated similarly in the table rotation type machine structure in FIG. 9. Here, it is assumed that one rotation axis that changes the inclination of the table is a first rotation axis, whereas the other rotation axis is a second rotation axis, and the rotation center axes of these two rotation axes intersect at right angle with each other in one point. The point of the intersection of the two rotation axes is assumed to be the origin and the coordinates of the tool tip are assumed to be (x(t), y(t), z(t)). The angle of the first rotation axis is assumed to be a(t), the angle of the second rotation axis is assumed to be c(t), and a(t) equals 0 when the table is horizontal. The rotation center axis of the first rotation axis is always identical to the X-axis. The rotation center axis of the second rotation axis is identical to the X-axis when the table is horizontal.

The distance W1 between the rotation center axis of the first rotation axis and the tool tip is represented by the following equation.

$$W1 = \sqrt{\{y(t)^2 + z(t)^2\}}$$

Accordingly, the second position deviation V1 of the first rotation axis is represented by the following equation.

$$V1 = \sqrt{\{y(t)^2 + z(t)^2\}} \times \Delta a$$

The distance W2 between the rotation center axis of the second rotation axis and the tool tip is represented by the following equation.

$W2=\sqrt{\{[y(t)\cos(a(t))-z(t)\sin(a(t))]^2+x(t)^2\}}$

Accordingly, the second position deviation V2 of the second rotation axis is represented by the following equation.

$V2=\sqrt{\{[y(t)\cos(a(t))-z(t)\sin(a(t)]^2+x(t)^2\}} \times \Delta c$

Even when the machine structure differs as shown above, the second position deviation can be calculated by multiplying the position deviations of the rotation axes by the distance between the rotation center axis of the rotation axis and the tool tip.

Figure 10:
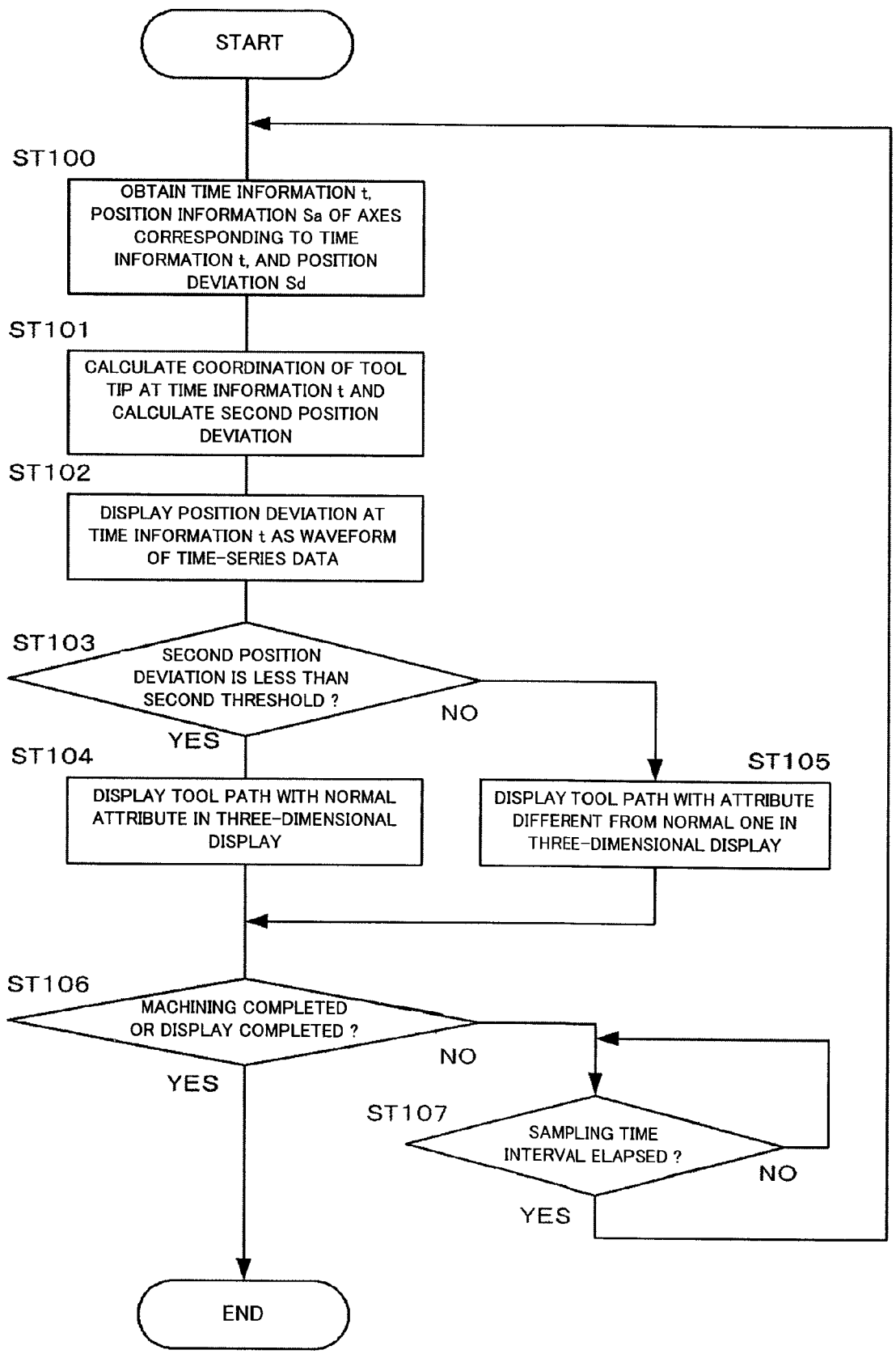
FIG. 10 is a flowchart showing an algorithm of display processing in which the embodiment of the tool path display apparatus according to the present invention selects the display attribute based on the second position deviation.

FIG. 10 is a flowchart showing an algorithm for selecting the display attribute based on the second position deviation. Only the parts that differ from those in the flowchart shown in FIG. 7 will be described.

In step ST101, the three-dimensional coordinates of the tool tip at time information t is calculated and the second position deviation is calculated.

In step ST103, the second position deviation calculated in step ST101 is compared with the threshold prepared in advance for comparison with the second position deviation.

FOURTH EXAMPLE

Position Deviation Synthetic Value

Figure 11:
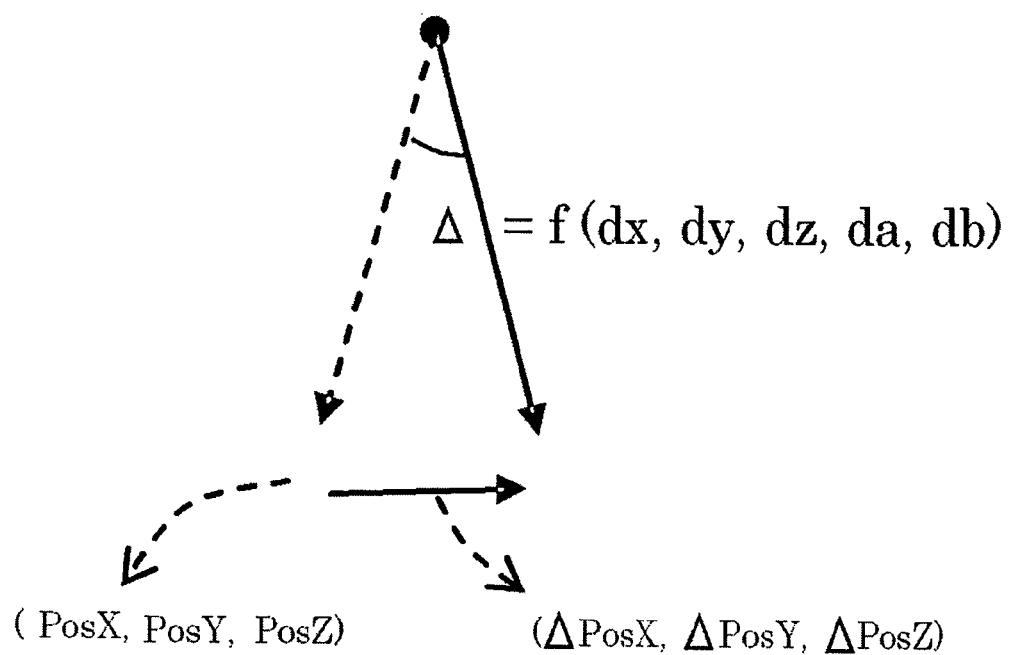
FIG. 11 shows the calculation of a position deviation synthetic value in case where the length (position deviation synthetic value) of a three-dimensional position deviation vector at a tool tip is compared with the threshold in display processing.

FIG. 11 shows the calculation of a position deviation synthetic value in case where the length (position deviation synthetic value) of a three-dimensional position deviation vector at the tool tip is compared with the threshold in display processing.

As described above, the coordinates (PosX, PosY, PosZ) of the tool tip are represented by the following equations.

$PosX=x(t)+L\times\cos(a(t))\times\sin(b(t))$ $PosY=y(t)+L\times\sin(a(t))$ $PosZ=z(t)-L\times\cos(a(t))\times\cos(b(t))$ If the position deviations of the individual axes are assumed to be dx, dy, dz, da, and db, the position deviation of the tool tip is represented by the following equations.

$\Delta PosX=dx-L\times\sin(a(t))\times\sin(b(t))\times da+L\times\cos(a(t))\times\cos(b(t))\times db$ $\Delta PosY=dy-L\times\cos(a(t))\times da$ $\Delta PosZ=dz+L\times\sin(a(t))\times\cos(b(t))\times da+L\times\cos(a(t))\times\sin(b(t))\times db$ If the length of this position deviation vector is assumed to be the position deviation synthetic value, the following equation holds.

(Position deviation synthetic value)=$SQRT(\Delta PosX^2+\Delta PosY^2+\Delta PosZ^2)$ The flowchart in this case is not shown, but the processing will be described with reference to the flowchart shown in FIG. 10.

In step ST101, the three-dimensional coordinates of the tool tip at time information t are calculated and the position deviation synthetic value is calculated. In step ST103, the position deviation synthetic value calculated in step ST101 is compared with the threshold prepared in advance for comparison with the position deviation value.

FIFTH EXAMPLE

Second Torque Command

Figure 12:
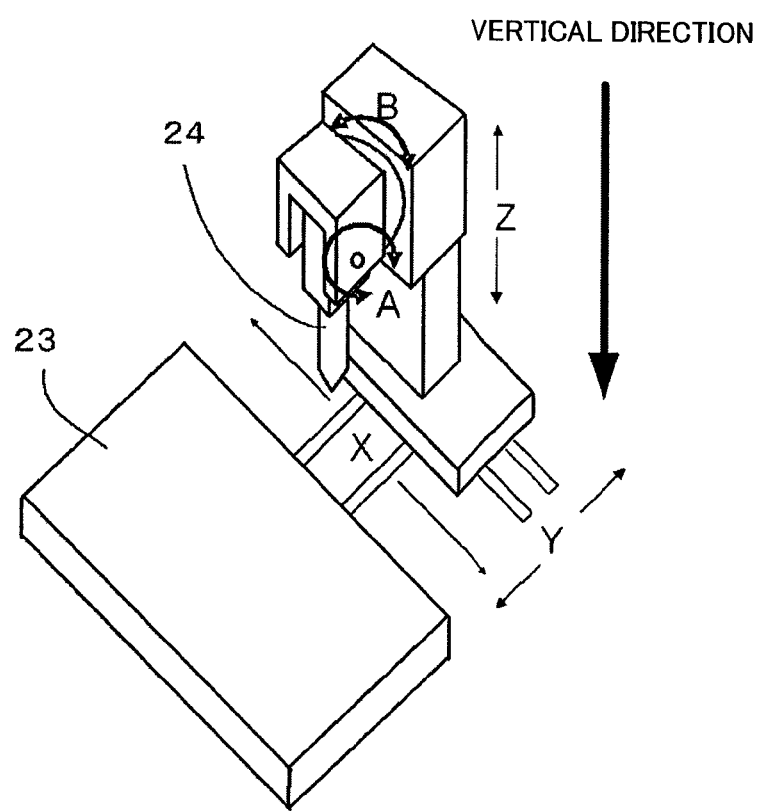
FIG. 12 shows the calculation of a second torque command in case where a second torque command with effects of gravity taken into account is compared with the threshold in display processing.

FIG. 12 shows the calculation of a second torque command in case where the torque command (second torque command with effects of gravity taken into account) that is different from the torque command indicated previously as the second example is compared with the threshold in display processing.

The Z-axis is affected by gravity because the Z-axis supports the spindle. The gravity applied to the Z-axis does not change irrespective of the attitude of the machine. Accordingly, if the torque equivalent to the gravity is assumed to be Tm, the second torque command is represented by Tz−Tm.

When the center of gravity of the spindle that turns by the A-axis is not present on a rotation axis, the A- and B-rotation axes are affected by gravity depending on the attitude of the machine. If the center of gravity is assumed to be present directly below the tool when it faces directly downward, the mass applied to the A- and B-axes are assumed to be Ma and Mb, respectively, and the distance between the rotation axis and the center of gravity is assumed to be R, then the second torque command Ta2 of the A-axis and the second torque command Tb2 of the B-axis are represented by the following equations.

$Ta2=Ta-Ma\times g\times R\times\sin(a(t))\times\cos(b(t))$ $Tb2=Tb-Mb\times g\times R\times\cos(a(t))\times\sin(b(t))$ The torque commands of the Z-, A-, and B-axes shown as the second example above are Tz, Ta, and Tb with no effect of gravity taken into account.

The flowchart in this case is not shown, but the processing will be described with reference to the flowchart shown in FIG. 10.

In step ST101, the three-dimensional coordinates of the tool tip at time information t are calculated and the second torque command is calculated. In step ST103, the second torque command calculated in step ST101 is compared with the threshold prepared in advance for comparison with the second torque command.

SIXTH EXAMPLE

Synthetic Speed or Synthetic Acceleration of the Tool Tip

When the synthetic speed or synthetic acceleration of the tool tip is compared with the threshold in display processing, the calculation of such synthetic speed or synthetic acceleration of the tool tip will be described below.

As described above, the coordinates (PosX, PosY, PosZ) of the tool tip are represented by the following equations.

$PosX=x(t)+L\times\cos(a(t))\times\sin(b(t))$ $PosY=y(t)+L\times\sin(a(t))$ $PosZ=z(t)-L\times\cos(a(t))\times\cos(b(t))$ The first and second order differential of the above coordinates are calculated with respect to time and the results are synthesized to obtain a synthetic speed Sv and synthetic acceleration Sa of the tool tip.

$Sv=SQRT\{(dPosX/dt)^2+(dPosY/dt)^2+(dPosZ/dt)^2\}$ $Sa=SQRT\{(d^2PosX/dt^2)^2+(d^2PosY/dt^2)^2+(d^2PosZ/dt^2)^2\}$

The flowchart in this case is not shown, but the processing will be described with reference to the flowchart shown in FIG. 10.

In step ST101, the three-dimensional coordinates of the tool tip at time information t are calculated and the synthetic speed or synthetic acceleration of the tool tip is calculated. In step ST103, the synthetic speed or synthetic acceleration of the tool tip calculated in step ST101 is compared with the threshold prepared in advance for comparison with the synthetic speed or synthetic acceleration of the tool tip.

The invention claimed is:

1. A tool path display apparatus for displaying a path of a tip of a tool attached to a machine tool, positions and attitudes of the tool and a workpiece machined by the tool being controlled by a plurality of drive axes including a rotation axis, the tool path display apparatus comprising:
　　data acquisition means that concurrently acquires and stores position information, speed information, acceleration information, position deviation information, and a torque command of each of the drive axes at each time moment, as time-series data;
　　tool path calculation means that calculates three-dimensional coordinates of the tip of the tool with respect to a coordinate system fixed to the workpiece using the position information of each of the drive axes at each time moment and structure information of the machine tool and obtains the three-dimensional path of the tip of the tool;
　　display means that displays, as a time-series waveform, at least one of the three-dimensional path of the tip of the tool obtained by the tool path calculation means and the time-series data obtained by the data acquisition means;
　　time axis selection means that selects any part of a time axis of a time-series waveform displayed by the display means; and
　　display attribute change means that changes a display attribute of the time-series waveform corresponding to the part of the time axis selected by the time axis selection means and the three-dimensional path of the tip of the tool corresponding to the part of the time axis selected by time axis selection means.

2. The tool path display apparatus according to claim 1, further comprising:
　　tool path selection means that selects any part of the three-dimensional path of the tip of the tool displayed by the display means; and
　　display attribute change means that changes a display attribute of the three-dimensional path of the tip of the tool selected by the tool path selection means and the time-series waveform in a time area in which position information underlying the three-dimensional coordinates that corresponds to the three-dimensional path is obtained.

3. The tool path display apparatus according to claim 1, further comprising first threshold setting means that sets a threshold to be compared with at least one of the position deviation and the torque command of each of the drive axes, wherein when at least one of the position deviation and the torque command exceeds the threshold, the time axis selection means selects a preset time range including a time moment at which the threshold is exceeded.

4. The tool path display apparatus according to claim 1, further comprising position deviation calculation means that multiplies a position deviation of the rotation axis by a rotation radius, which is a distance between a rotation center axis of the rotation axis and the tip of the tool, to calculate a second position deviation and second threshold setting means that sets a second threshold to be compared with the second position deviation calculated by the position deviation calculation means, wherein when the second position deviation exceeds the second threshold, the time axis selection means selects a preset time range including a time moment at which the second threshold is exceeded.

5. The tool path display apparatus according to claim 1, further comprising position deviation synthetic value calculation means that calculates a three-dimensional position deviation vector at the tip of the tool using the position information, the position deviation, and the machine structure information of each of the drive axes at each time moment and calculates the length of the calculated three-dimensional position deviation vector as a position deviation synthetic value and third threshold setting means that sets a third threshold to be compared with the position deviation synthetic value calculated by the position deviation synthetic value calculation means, wherein when the third position deviation exceeds the third threshold, the time axis selection means selects a preset time range including the time moment at which the third threshold is exceeded.

6. The tool path display apparatus according to claim 1, wherein said drive axes are affected by gravity, and tool path display apparatus further comprises gravity load calculation means that calculates a load torque by gravity applied to each of the drive axes using preset information of gravity applied to the drive axis, the machine structure information, and position information of each of the drive axes at each time moment, torque command calculation means that obtains a second torque command by subtracting the load torque by gravity from the torque command, and fourth threshold setting means that sets a fourth threshold to be compared with the second torque command calculated by the torque command calculation means, wherein when the second torque command exceeds the fourth threshold, the time axis selection means selects a preset time range including a time moment at which the fourth threshold is exceeded.

7. The tool path display apparatus according to claim 1, further comprising synthetic value calculation means that calculates a synthetic speed vector or a synthetic acceleration vector at the tip of the tool using the position information and the machine structure information of each of the drive axes at each time moment and calculating a length of the calculated vector as a synthetic speed or synthetic acceleration and fifth threshold setting means that sets a fifth threshold to be compared with the synthetic speed or the synthetic acceleration calculated by the synthetic value calculation means, wherein when the synthetic speed or the synthetic acceleration exceeds the fifth threshold, the time axis selection means selects a preset time range including a time moment at which the fifth threshold is exceeded.

* * * * *